United States Patent [19]

Reinhardt et al.

[11] Patent Number: 4,688,380
[45] Date of Patent: Aug. 25, 1987

[54] CONTROL MEANS FOR A DRIVE SYSTEM WITH IMPRESSED PRESSURE

[75] Inventors: Peter Reinhardt, Lohr; Heinrich Nikolaus, Passau; Frank Metzner, Hamburg, all of Fed. Rep. of Germany

[73] Assignee: Mannesmann Rexroth GmbH, Lohr, Fed. Rep. of Germany

[21] Appl. No.: 893,015

[22] Filed: Aug. 4, 1986

[30] Foreign Application Priority Data

Aug. 6, 1985 [DE] Fed. Rep. of Germany ....... 3528096

[51] Int. Cl.$^4$ ............................................. F16D 31/02
[52] U.S. Cl. ........................................ 60/420; 60/446
[58] Field of Search ................ 60/446, 490, 422, 451, 60/420

[56] References Cited

U.S. PATENT DOCUMENTS

| | | | |
|---|---|---|---|
| 3,756,030 | 9/1973 | Ruhl et al. | 60/490 X |
| 4,029,439 | 6/1977 | Adams | 60/449 X |
| 4,559,778 | 12/1985 | Krusche | 60/449 X |

*Primary Examiner*—William E. Wayner
*Attorney, Agent, or Firm*—Harness, Dickey & Pierce

[57] ABSTRACT

A secondarily controlled hydrostatic machine with variable volume is connected to a line with impressed system pressure which is fed by a primary unit. By switching over the primary unit the secondary unit is subjected to a displacement amount which results in as large as possible a pivot angle of the secondary unit to obtain the highest possible efficiency. The switching over takes place in dependence upon an upper and lower switching point corresponding to the desired pivot angle range of the secondary unit.

15 Claims, 3 Drawing Figures

CONTROL MEANS FOR A DRIVE SYSTEM WITH IMPRESSED PRESSURE

DESCRIPTION

The invention relates to a control means for a drive system with impressed pressure having the features set forth in the preamble of claim 1.

Such drive systems are known (DE-OS No. 2,739,968), the speed of rotation control of the secondary unit taking place hydraulically. It is also known (No. P 34 09 566.7) to provide as primary pressure medium or fluid source two constant pumps which deliver into the pressure line. The connection and disconnection of the constant pumps takes place in dependence upon the pressure in the pressure line. The secondary units are also constant machines adapted to be connected and disconnected. According to an elder proposal (No. P 34 41 185.2) the speed of a secondary unit and the pressure of the primary unit are controlled with an electrical circuit arrangement, and to improve the efficiency the pressure is lowered in a superimposed control closed loop when a predetermined limit angle of the adjustment means of the secondary unit is reached.

To achieve the highest possible efficiency for the secondary unit the absorption or displacement volume of the secondary unit should be set to the highest possible value, i.e. the pivot angle should be as large as possible. Now, the pivot angle of the secondary unit depends on the load moment taken off and the operating pressure. For a given load moment the pivot angle can thus be set via the operating pressure to optimum efficiency, the operating pressure depending in turn on the displacement furnished by the primary unit and the amount taken up by the secondary unit.

The problem underlying the invention of increasing the efficiency for the secondary drive is thus solved according to the invention in that the inflow furnished by the primary unit is modified so that the actuator or adjusting member of the secondary unit is held in an optimum operating range.

According to the invention the pivot angle of the secondary unit is measured and compared with switching points. The measurement is by means of a potentiometer or by limit switches. On the other hand, the switching points can also be preset by the desired value of the pivot angle for the secondary unit.

According to the invention when an upper switching point is reached, which is for example 80% pivot angle for the secondary unit, the primary unit is switched to full displacement of 100%. This displacement is retained until the value drops below the lower switching point corresponding to 60% pivot angle of the secondary unit. Then the displacement flow of the primary unit is reduced for example to 50%. If the reduced displacement flow of the primary unit is still too large the operating pressure will rise to a maximum value and when that is reached the primary unit is reset to zero.

If however the secondary unit requires a greater displacement flow than the primary unit can furnish with reduced displacement the operating pressure drops and the pivot angle of the secondary unit increases. If it then reaches the upper switching point of 80% the displacement of the primary unit is again switched to full displacement.

Thus, the switching over of the primary unit to full and reduced displacement influences the secondary unit so that the latter can operate in a working range favourable to the efficiency.

An example of embodiment of the invention will be explained hereinafter with the aid of the drawings, wherein.

Figure 1:
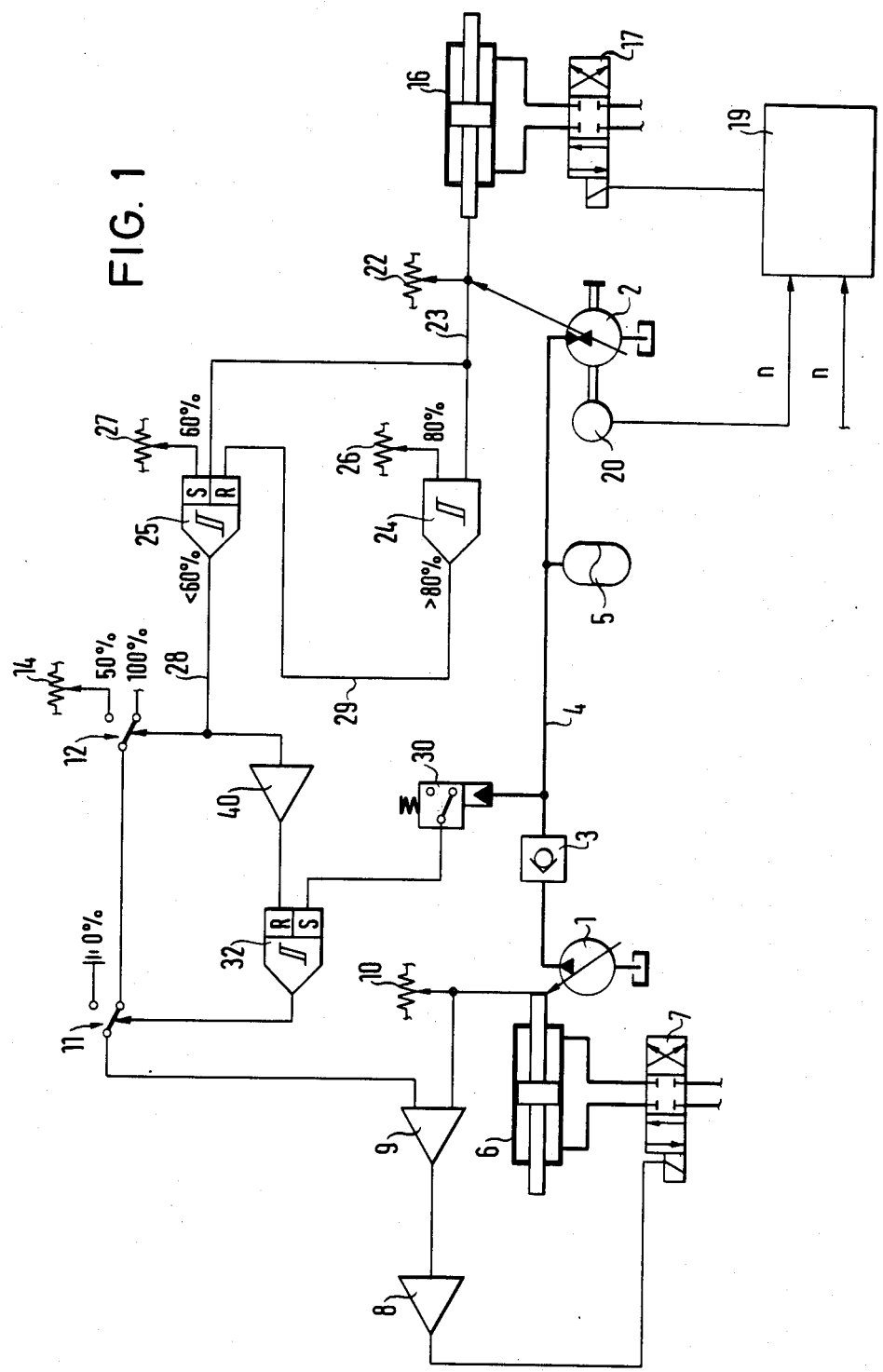
FIG. 1 shows a control means having a primary unit with variable volume.

A primary unit 1 is connected to a secondary unit 2 via a pressure line 4 which is provided with a check valve 3 and to which a storage means 5 is connected. The primary unit 1 is a hydrostatic machine which operates as a pump and the displacement of which is variable. For this purpose an actuator or adjusting cylinder 6 is employed whose cylinder chambers are connectable via a directional valve 7 to a fluid source or a tank respectively. The directional valve 7 is electrically driven by a driver stage 8. The driver stage 8 is subjected to the output signal of a position controller 9 whose actual value input is connectable to a voltage tapped from a potentiometer 10 corresponding to the position of the actuator cylinder 6 and whose desired value input is connectable by means of switches 11 and 12 to various voltage sources depending on the switch position. By means of the voltages predetermined displacements are set at the pump 1.

If the switches 11 and 12 are in the position illustrated a voltage is applied to the position controller 9 which corresponds to a displacement of 100% of the pump 1. If the switch 12 is switched over a voltage is supplied which corresponds to a displacement of for example 50% and which can be set at a potentiometer 14. If the switch 11 is switched over a voltage corresponding to the pivot angle 0 passes to the controller 9 and the pump 1 is reset to zero displacement.

The secondary unit 2 is also a hydrostatic machine, in particular an axial piston machine, with variable absorption or displacement volume which in motor operation takes fluid from the line 4 or the storage means 5 and in pump operation returns fluid driven by a load to the storage means 5. The adjustment of the absorption or displacement volume of the secondary unit is at an adjusting cylinder 16 whose cylinder chambers are connectable via a directional valve 17 to a fluid source or a tank. The valve 17 is controlled by the output signal of a speed control closed loop 19 which in addition to a speed desired value receives the speed actual value which is generated in a tachogeneraor 20 coupled to the secondary unit 2. The speed control can be analog or digital. A hydraulic control is also possible as described in DE-OS No. 2,739,968. The secondary unit 2 is for example an axial piston machine in which the adjusting cylinder 16 changes the pivot angle of the actuator for changing the stroke. The pivot angle of the secondary unit 2 is defined by the torque furnished at a load, not illustrated, and the operating pressure in the line 4. The operating pressure adjusts itself corresponding to the displacement of the pump 1 and the absorption volume of the secondary unit 2 operating as motor. If the displacement furnished by the pump 1 is greater than the amount used by the motor the operating pressure increases and in the converse case the operating pressure drops, the storage means 5 simultaneously being charged or discharged.

With the control circuit described hereinafter it is possible to effect that independently of the torque taken off at the motor 2 the pivot angle of the secondary unit is adjusted in a range in which the secondary unit has the highest possible efficiency. This is a range whose lower value should not drop below 60% absorption volume whilst the upper limit is at about 80% to have a reserve with very large load moments. Thus, in the example selected the aim will be to keep the volume of the secondary unit in a range between about 60 and 80% volume or pivot angle.

The position (pivot angle) of the actuator or adjusting means of the secondary unit 2 is measured. For this purpose the tap of a potentiometer 22 is connected to the actuator. The tapped voltage is supplied via a line 23 to the setting input of a first switching amplifier 24 and to the setting input of a second switching amplifier 25. A second input of the switching amplifier 24 receives from a potentiometer 26 a voltage which corresponds to the upper switching point, which corresponds to a pivot angle of 80%, and a second input of the switching amplifier 25 receives a voltage set at a potentiometer 27 and corresponding to a lower switching point of 60% pivot angle. If the voltage value at the line 23 reaches the lower switching point the switching amplifier 25 switches over and furnishes an output signal to the line 28. If the voltage on the line 23 reaches the upper switching point the switching amplifier 24 switches over and furnishes a signal via a line 29 to the reset input of the switching amplifier 25 so that the signal on the line 28 is disconnected. The switch 12 is actuated in dependence on the output signal on the line 28.

The switch 11 is actuated via a switching amplifier 32 controlled via a pressure switch 30 in dependence upon the operating pressure in the line 4, the reset input R being connected to the line 28.

The mode of operation is as follows: whenever the pivot angle of the secondary unit 2 is greater than 80%, i.e. a high load moment is required, the primary unit 1 switches to the full displacement of 100%. Since the signal on the line 23 is equal or greater than the upper switching point of 80%, both switching amplifiers 24 and 25 respond but an output signal on the line 28 is suppressed by the output signal of the switching amplifier 24 applied to the reset input R of the switching amplifier 25. The switching amplifier 32 does not supply any signal either because its inputs do not carry signals. The switches 11 and 12 are in the position illustrated so that the voltage corresponding to the displacement of 100% is applied to the position controller 9. In this operating state the secondary unit 2 requires less displacement than furnished by the primary unit 1 and consequently the storage means 5 is possibly charged and then the pressure in the line 4 rises. This leads to a reduction of the pivot angle of the secondary unit 2, assuming that the load and speed setting remain the same. Via a self-holding no switching over of the amplifier 25 takes place even when the signal of the amplifier 24 disappears when the value drops below 80% on the line 29.

When the pivot angle of the secondary unit 2 reaches the lower switching point of 60% the switching amplifier 25 responds and furnishes an output signal on the line 28 by which the switch 12 is switched over. The position controller is thereby subjected to a voltage corresponding to 50% displacement of the primary unit 1. The signal on the line 28 also reaches the reset input of the switching amplifier 32 which does not however switch over. If the load moment does not further diminish after a discharge of the storage means 5 the operating pressure in the line 4 drops because the displacement of 50% offered by the primary unit 1 is less than the amount taken by the secondary unit 2. With diminishing pressure, however, the secondary unit 2 is more greatly deflected in order to furnish the moment required. As soon as the upper switching point of 80% is again reached the switching amplifier 24 responds and activates the switching amplifier 25 which switches back via its occupied reset input so that the switch 12 switches the primary unit 1 over to the full displacement flow of 100%.

If however the consumer flow taken up by the secondary unit 2 with reduced displacement of the primary unit 1 is smaller, whether by reduction of the load and/or of the drive speed, the pressure in the line 4 increases. If a maximum operating pressure is reached the pressure switch 30 responds, passes a signal to the setting input of the amplifier 32 and the switching amplifier 32 switches the switch 11 over so that the primary unit 1 is reset to zero displacement.

Due to the withdrawal of displacement the pressure in the line 4 again drops and the pivot angle of the secondary unit 2 increases until it has reached the upper switching point corresponding to 80%, whereupon in the manner explained the displacement of the primary unit 1 is switched to 100%. A switching to 50% displacement on reaching the pivot angle of 60% does not take place in this case because here the switching amplifier 25 cannot activate the switch 12 and the switch 11 via the reset input of the switching amplifier 32 until the switching amplifier 24 has responded on reaching the upper switching point of 80%.

Figure 2:
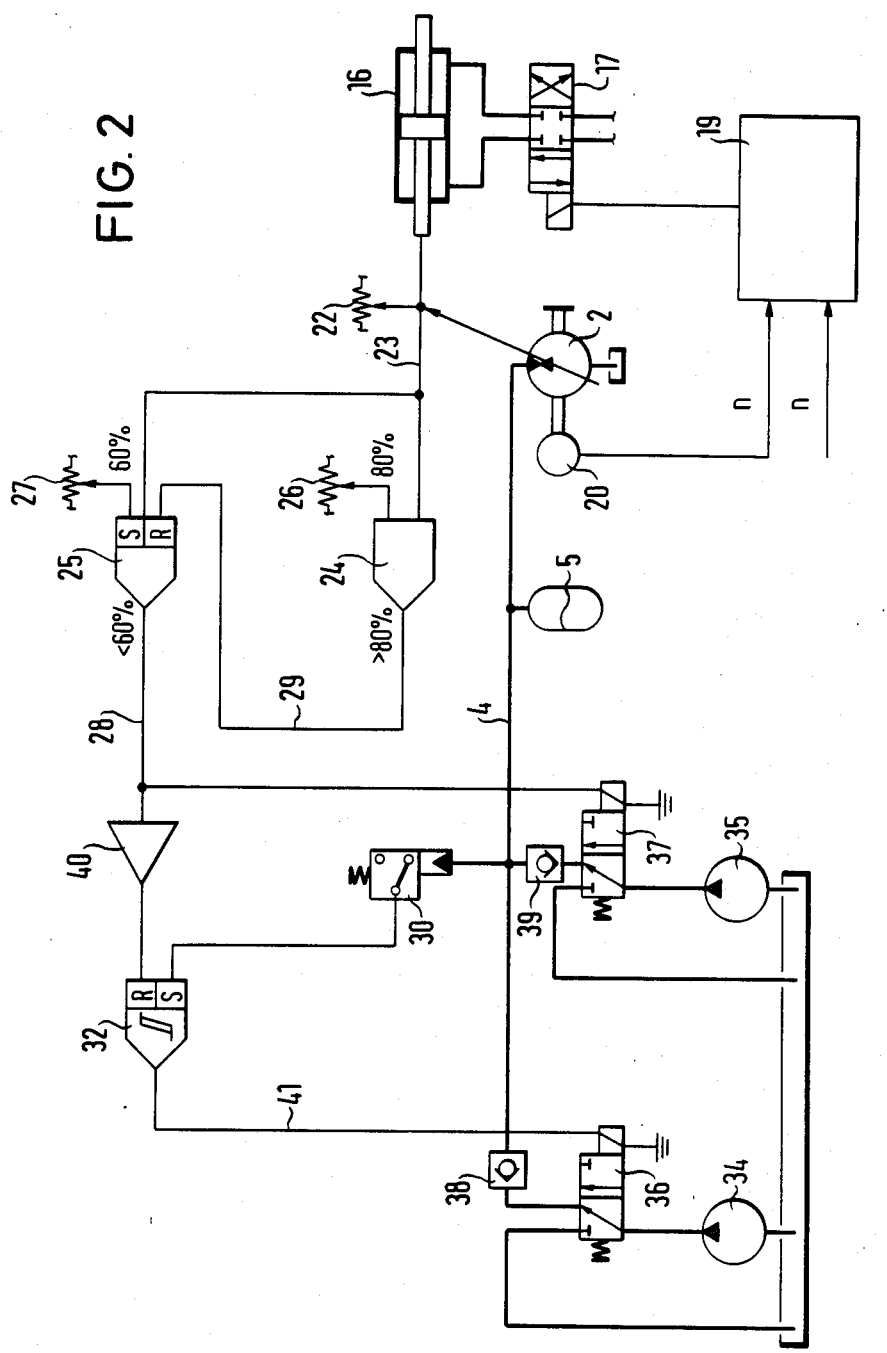
FIG. 2 shows a control means with two constant pumps.

In the embodiment according to FIG. 2 the primary unit 1 with variable displacement can be replaced by pumps of constant displacement. In FIG. 2 two constant pumps 34 and 35 are provided whose displacements are graduated in the desired manner, for example in each case 50%, and which can be selectively connected and disconnected via directional valves 36 and 37 as well as check valves 38 and 39 respectively.

Otherwise, in FIG. 2 the components already explained with reference to FIG. 1 are designated by the same reference numerals. The difference is that the output of the switching amplifier 25 is led via the line 28 to the electrically actuable directional valve 37 and via a matching member 40 to the reset input R of the switching amplifier 32, the output of which drives the electrically actuable directional valve 36 via the line 41.

The mode of operation is as follows: if the pivot angle of the secondary unit 2 is greater than 80% so that in the manner already explained the outputs of the switching amplifiers 25 and 32 are unoccupied, both pumps 34 and 35 will deliver the full displacement of twice 50% to the line 4 via the valves 36 and 37. If the pivot angle of the secondary unit 2 diminishes and drops beneath the switching point of 60% of the switching amplifier 25, the latter again furnishes an output signal on the line 28 with which the valve 37 is switched over so that the pump 35 is disconnected from the line 4 and in idling operation pumps back to the tank. Since the line 28 is led to the reset input of the switching amplifier 32, the output 41 thereof remains unoccupied and only the pump 34 continues to deliver to the secondary unit 2. If the pivot angle again rises above 80%, via the switching amplifier 24 and the reset input of the amplifier 25 the latter is reset so that the valve 37 switches over and again the full displacement flow is available.

If however by further reduction of the secondary unit 2 the pressure in the line 4 increases until the pressure switch 30 responds, the switching amplifier 32 will then also be activated and via the output signal thereof on the line 41 switch over the valve 36 and thus disconnect the pump 34 from the line 4. Both pumps 34 and 35 are thus reset to zero displacement.

As in the example of embodiment explained above the connection of the two pumps 34 and 35 is effected when the pivot angle of the secondary unit 2 has again exceeded 80%.

Figure 3:
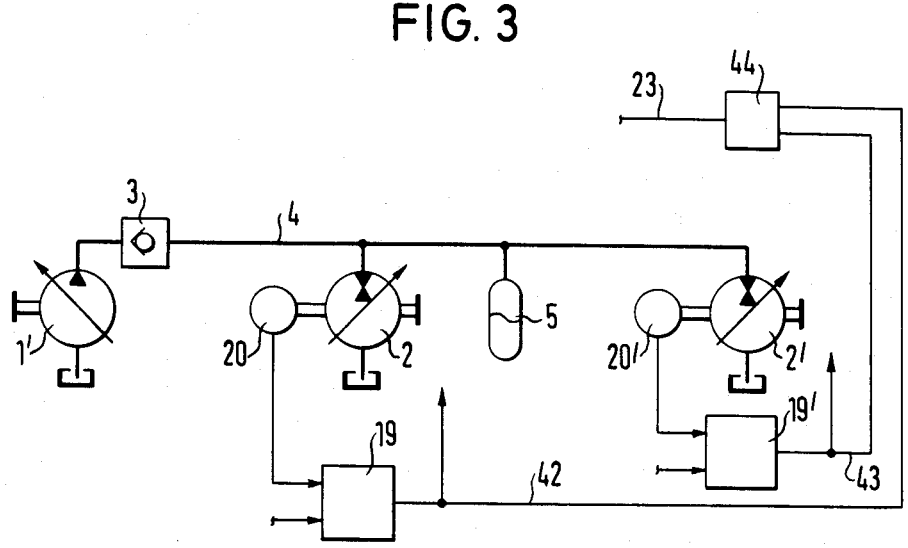
FIG. 3 shows a control means having a plurality of secondary units.

In FIGS. 1 and 2 the pivot angle of the secondary unit is directly detected by the potentiometer 22. If this is not possible of desirable, as pivot angle the signal supplied by the speed controller 19 to the valve 17 may also be used, representing the desired value of the pivot angle. FIG. 3 shows schematically such a construction in which from the actual value furnished by the tachogenerator 20 and the desired value of the speed in the speed controller 19 the signal on the line 42 for driving the directional valve, not illustrated, for actuating the actuating means, also not illustrated, of the secondary unit 2.

In FIG. 3 a further secondary unit 2' is also connected to the pressure line 4 which likewise has a speed controller 19' whose output signal on the line 43 is supplied to the associated directional valve for actuating the adjusting means, which are not illustrated. The output signals of the two speed controllers 19 and 19' are led to a switching logic 44 whose output is connected to the lines 23 illustrated in FIGS. 1 and 2 with the switching amplifiers 24, 25 and 32.

With the switching logic 44 it is possible to optimize the efficiency for several secondary units 2 and 2' connected to the same line 4. The control of the pressure in the line 4 by means of the control of the displacement flow of the pump 1 is then carried out with the following logic selection executed in the switching logic 44:

the switching over of the primary unit 1' to full displacement takes place when the pivot angle of one of the connected secondary units 2 and 2' exceeds the upper fixed normal value of for example 80%.

The displacement of the primary unit 1' is reduced when the pivot angle of all the secondary units 2 and 2' drops below the fixed minimum value of for example 60%. Of course, the input of the switching logic 44 can also be subjected to the signals of displacement sensors with which in each case the actual pivot angle of the secondary units is measured. The logic network 44 is for example a maximum value former which switches through the highest signal present at its inputs to the output and thus into the line 23.

We claim:

1. Control means for a drive system with impressed pressure consisting of a hydrostatic fluid source with adjustable displacement as primary unit and a hydrostatic machine with variable volume as secondary unit, comprising a storage means in the pressure line between the fluid source and the hydrostatic machine and a speed controller which in dependence upon a speed actual value of a tachogenerator coupled to the machine and an arbitrarily settable speed desired value generates a control signal for actuating the adjustment member of the secondary unit for adjusting the volume of the secondary unit, characterized in that the primary unit (1) is switchable between a full and a reduced displacement, that the switching over to the full displacement takes place when the adjustment of the secondary unit (2) has reached at least a value corresponding to an upper volume and that the switching over to the reduced displacement takes place when the volume adjustment of the secondary unit goes below a value corresponding to a lower volume.

2. Control means according to claim 1, characterized in that on exceeding a maximum operating pressure in the pressure line (4) the displacement of the primary unit (1) is switched to zero.

3. Control means according to claim 1, characterized in that the value of the volume adjustment corresponding to the upper and lower volumes is defined by an actual value or desired value.

4. Control means according to claim 1, characterized in that the position of the actuator of the secondary unit (2) is measured and compared with a predetermined upper and lower switching point.

5. Control means according to any one of claims 1, characterized in that for the adjusting means of the primary unit (1) a position control closed loop (9) is provided whose desired value input is connected via switching means (11, 12) to voltage sources corresponding to the displacement.

6. Control means according to claim 5, characterized in that a switch (12) is provided for switching over from a voltage source corresponding to the full displacement to a voltage source corresponding to the reduced displacement and the switch is driven by a signal which is generated in dependence upon reaching the upper and lower switching point.

7. Control means according to claim 6, characterized in that the signal is generated in a first switching amplifier (25) which responds when the value goes below the lower switching point.

8. Control means according to claim 7, characterized in that a reset input of the first switching amplifier (25) is connected to the output of a second switching amplifier (24) which responds when the upper switching point is exceeded.

9. Control means according to claim 6, characterized in that a measured value corresponding to the adjustment of the secondary unit (2) is supplied to the two switching amplifiers (24, 25).

10. Control means according to any one of claims 1, characterized in that the upper switching point corresponds to an adjustment of the secondary unit to about 80% volume 11. Control means according to any one of claims 1, characterized in that the lower switching point corresponds to an adjustment of the secondary unit to about 60% volume.

12. Control means according to any one of claims 1 to 11, characterized in that the reduced displacement of the primary unit (1) corresponds to a displacement of about 50%.

13. Control means according to any one of claims 1, characterized in that as primary unit at least two pumps are provided each having a fixed displacement.

14. Control means according to claim 12, characterized in that two pumps are provided which can be connected and disconnected corresponding to the adjustment volume of the secondary unit.

15. Control means according to claim 1 for a plurality of secondary units connected to the pressure line, characterized in that the switching over of the primary unit (1) to full displacement takes place when the adjustment of at least one secondary unit (22') reaches at least a value corresponding to the upper volume and the switching over to the reduced displacement takes place when the volume adjustment of all the secondary units goes below the value corresponding to the lower volume.

* * * * *